P. CHESELKA.
RAILWAY CAR BRAKE.
APPLICATION FILED AUG. 14, 1917.

1,256,660.

Patented Feb. 19, 1918.
2 SHEETS—SHEET 1.

Inventor
P. Cheselka

By A. M. Wilson
Attorney

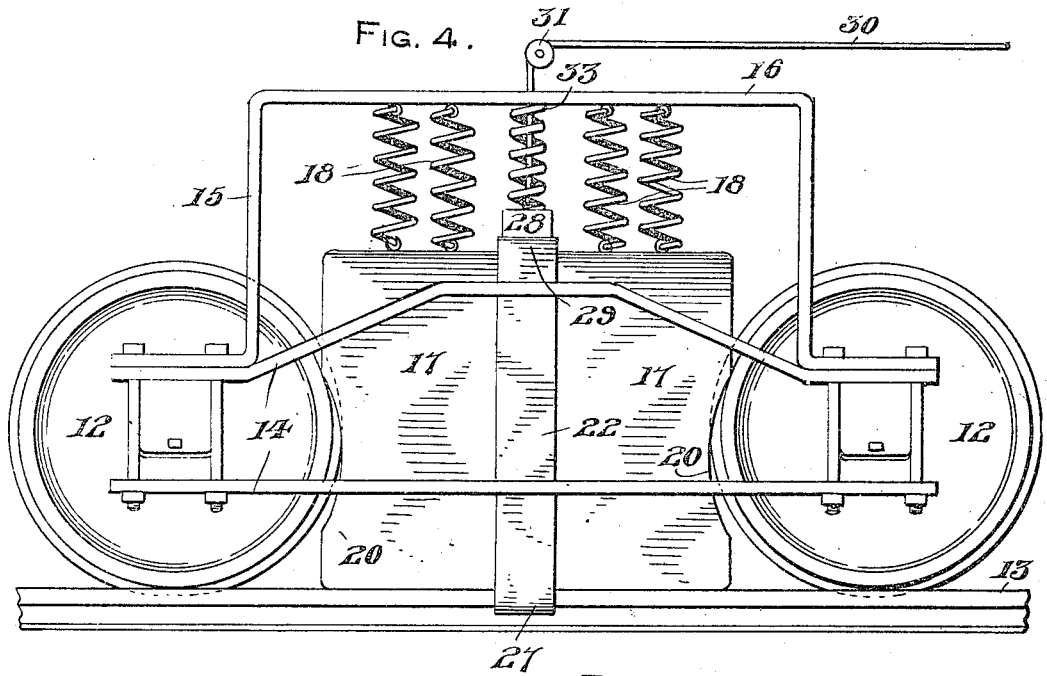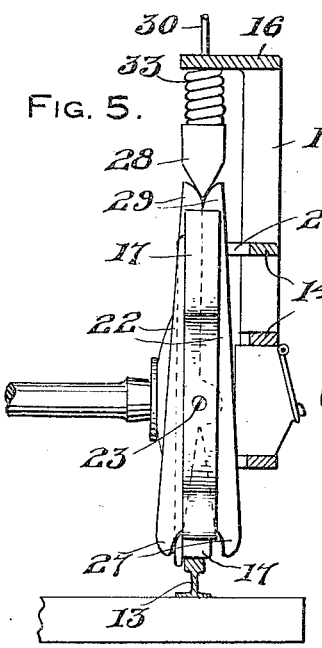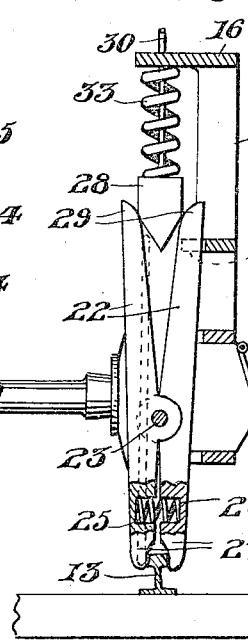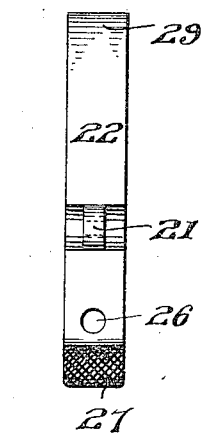

UNITED STATES PATENT OFFICE.

PETER CHESELKA, OF FAIRBANK, PENNSYLVANIA, ASSIGNOR OF ONE-EIGHTH TO GEORGE KUPEC, ONE-EIGHTH TO JOHN SLOSAR, ONE-EIGHTH TO STEFAN DUHOVAN, AND ONE-EIGHTH TO ANTON BLASINSKY, ALL OF NEW SALEM, PENNSYLVANIA.

RAILWAY-CAR BRAKE.

1,256,660.

Specification of Letters Patent. Patented Feb. 19, 1918.

Application filed August 14, 1917. Serial No. 186,131.

*To all whom it may concern:*

Be it known that I, PETER CHESELKA, a subject of the King of Hungary, residing at Fairbank, in the county of Fayette and State of Pennsylvania, have invented certain new and useful Improvements in Railway-Car Brakes, of which the following is a specification.

This invention relates to new and useful improvements in railway car brakes.

The primary object of the invention is the provision of a brake for cars such as mining cars adapted for locking the truck frame of the car to the railway rails when the device is operated.

A further object of the device is the provision of a brake appliance for car trucks arranged for frictionally engaging the track and wheels simultaneously, thereby quickly stopping the car.

A still further object of the device is the provision of a car brake that is strong and simple in its construction adapted for locking the car in stationary position upon the track when found desirable.

In the drawings forming a part of this application and in which like designating characters refer to corresponding parts throughout the several views, Figure 1 is a side elevation of a car truck provided with the present device.

Fig. 4 is a view similar to Fig. 1 with the brake in its engaging position.

Fig. 5 is a vertical sectional view of Fig. 1.

Fig. 6 is a similar vertical sectional view of Fig. 4.

Fig. 7 is an edge view of one of the brake members and

Fig. 8 is a view of one of the jaw members detached.

Figure 1:
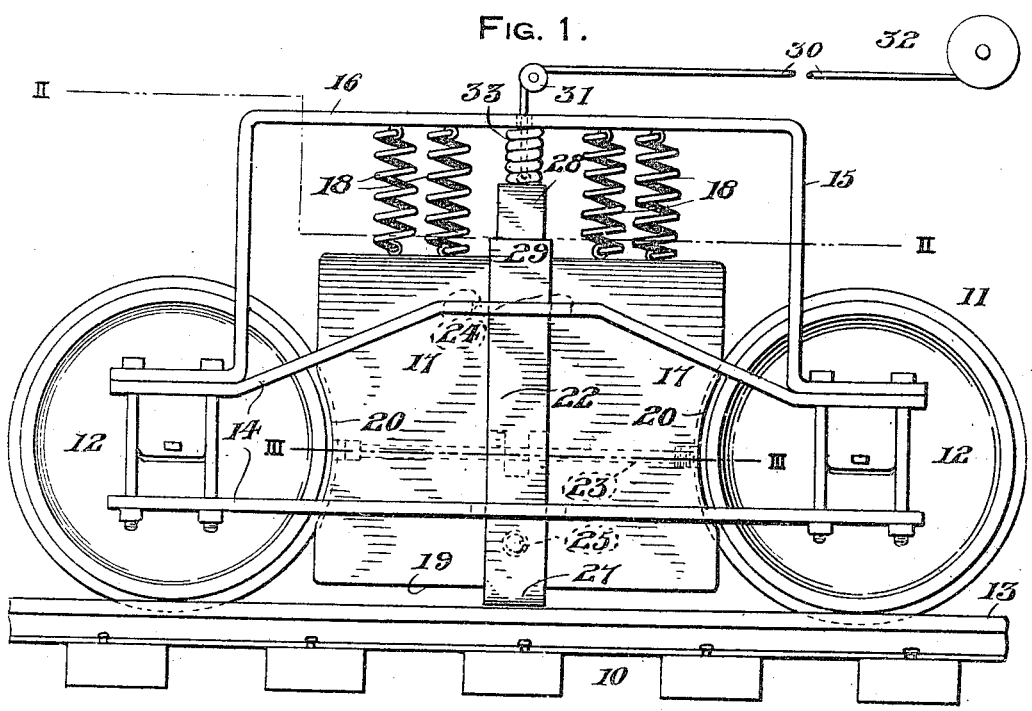
Figure 3:
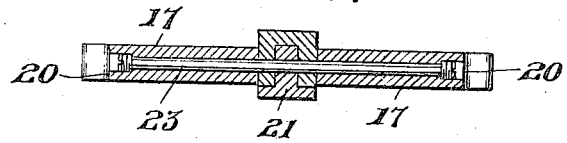
Fig. 3 is a horizontal sectional view taken upon line III—III of Fig. 1.
Figure 2:
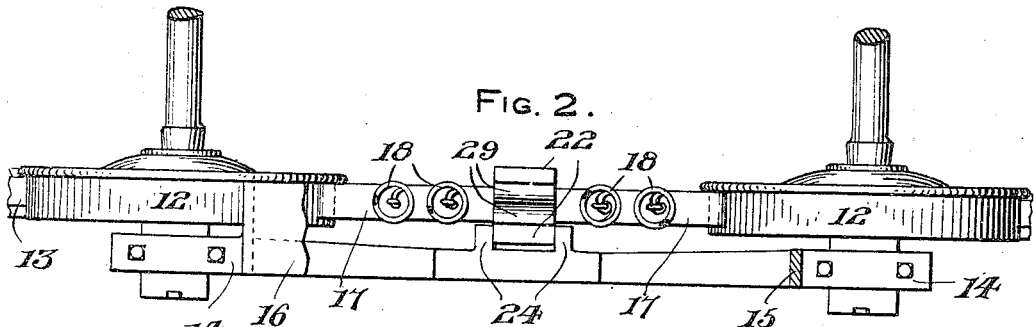
Fig. 2 is a sectional view thereof taken upon line II—II of Fig. 1.

Referring more in detail to the drawings, a railroad track 10 is illustrated having a car truck 11 mounted thereon and provided with wheels 12 positioned upon the side rail 13 of the track and arranged with a frame 14 of substantially the usual form.

An inverted U-shaped bracket 15 is mounted upon the frame 14 having a top plate 16 from which blocks or brake shoe members 17 are suspended by means of springs 18. The springs 18 normally maintain the blocks 17 with their lower faces 19 spaced from the rail 13 while the said blocks are interposed between the wheels 12 and are arranged with arcuate wheel accommodating portions 20.

The clamp 21 in the form of a pair of tongs having two sections 22 is arranged between the blocks 17 by means of a pivot rod 23 upon which the sections 22 are mounted in pivotal relations.

A guide 24 is carried by the car frame 14 within which one of the clamp sections 22 is freely positioned while a spring 25 arranged in sockets 26 of the sections 22 normally maintains the track engaging jaws 27 in spaced relations, the clamp being arranged above the level of the track as best illustrated in Fig. 5 of the drawings.

A wedge 28 is suspended above the normally closed upper ends 29 of the clamp 21 by means of a cord 30 passing through the member 16 and arranged over a pulley 31 and thence passing to any convenient regulating means therefor such as the turn drum 32. A spring 33 is arranged between the wedge 28 and the top 16 normally under compression by reason of the pull exerted upon the wedge 28 by the cord 30.

The construction is normally arranged as illustrated in Figs. 1 and 5 of the drawings and when desired to operate the brake, the cord 30 is released permitting the wedge 28 to fall of its own weight, augmented by the force of the spring 33, thereby bringing the pointed lower end 34 of the wedge between the end 29 of the clamp sections 22 and forcibly depressing the upper ends of the clamp 21 as well as forcing the clamp and the blocks 17 downwardly. In this manner, the lower faces 19 of the blocks 17 will be forced against the rail 13 by means of the spring 33 the clamp 21 being carried downwardly with the blocks bringing the jaw ends 27 of the clamp into grasping engagement with the rail 13. The downward movement of the block 17 also brings the upper portion of the cut-away faces 20 thereof in wedging engagement with the wheels 12. A serviceable and strong brake is arranged adapted for stopping the movements of the wheels 12 as well as for frictionally engaging the blocks 17 with the rail 13 and simultaneously engaging the clamp 21 with the rail, whereby the car is stopped.

It will be understood upon pulling the cord 30 and elevating the wedge 28, the spring 33 will be then placed under compression and the block 17 and the clamp 21 being released, the springs 18 will elevate the blocks and clamp to their normal inoperative position as illustrated in Fig. 1. It will be evident that any convenient means for elevating the wedge 28 may be employed without departing from the spirit and scope of this invention.

What I claim as new is:—

1. A brake for a railway car comprising a support, spaced blocks adapted for arrangement between the adjacent wheels of the car normally positioned out of contact with the wheels and track, a rail clamp arranged between said blocks and depressing means for blocks and closing means for the clamp operatively arranged between the clamp and said support.

2. A railway brake comprising in combination with the spaced wheels of a car frame mounted upon a track, a support carried by said frame, blocks arranged between the said wheels above the truck with arcuate side portions normally spaced from said wheels, a clamp attached to said blocks and arranged therebetween with normally opened jaws above the level of the track and lowering means for said blocks and clamp associated with the said support.

3. A railway brake comprising in combination with the spaced wheels of a car frame mounted upon a track, a support carried by said frame, blocks arranged between the said wheels above the truck with arcuate side portions normally spaced from said wheels, a clamp attached to said blocks and arranged therebetween with normally opened jaws above the level of the track and a combined lowering means for the blocks and clamp and closing means for the clamp operatively arranged between the clamp and support and retracting means for said lowering and closing means.

4. A railway brake comprising in combination with the spaced wheels of a car frame mounted upon a track, a support carried by said frame, blocks arranged between the said wheels above the truck with arcuate side portions normally spaced from said wheels, a clamp attached to said blocks and arranged therebetween with normally opened jaws above the level of the track, the said clamp having normally closed upper ends, a weighted wedge arranged adjacent the said ends, a depressing spring normally tensioned between the said wedge and support and a cord attached to said wedge and extending above the said support adapted for elevating the wedge and comprising the said spring and elevating springs arranged between said blocks and supports.

In testimony whereof I affix my signature.

PETER CHESELKA.